United States Patent [19]

Marx et al.

[11] 3,955,037

[45] May 4, 1976

[54] MAGNETIC DISCS HAVING A MULTI-COMPONENT BINDER

[75] Inventors: Matthias Marx, Bad Duerkheim; Job-Werner Hartmann, Ludwigshafen; Werner Ostertag, Oberer-Bergel-Weg, all of Germany

[73] Assignee: BASF Aktiengesellschaft, Ludwigahsfen (Rhine), Germany

[22] Filed: Nov. 6, 1974

[21] Appl. No.: 521,459

[30] Foreign Application Priority Data

Nov. 8, 1973 Germany............................ 2355849

[52] U.S. Cl............................ 428/418; 252/62.54; 427/128; 427/130; 428/460; 428/900
[51] Int. Cl.²........................................ H01F 10/02
[58] Field of Search ...........................................
427/127–132; 428/900, 418, 460; 252/62.54

[56] References Cited

UNITED STATES PATENTS

| | | | |
|---|---|---|---|
| 2,904,875 | 9/1959 | Trigg................................ | 427/128 X |
| 3,320,090 | 5/1967 | Graubart............................ | 428/900 |
| 3,474,073 | 10/1969 | Higashi............................ | 252/62.54 |
| 3,560,388 | 2/1971 | Higashi............................ | 252/62.54 |
| 3,597,273 | 8/1971 | Akashi et al...................... | 252/62.54 |
| 3,689,317 | 9/1972 | Akashi et al...................... | 252/62.54 |
| 3,781,210 | 12/1973 | Lohoff.............................. | 252/62.54 |
| 3,781,211 | 12/1973 | Lohoff.............................. | 252/62.54 |
| 3,793,074 | 2/1974 | Frankenthal...................... | 427/130 |
| 3,799,794 | 3/1974 | Miller .............................. | 427/128 X |
| 3,840,400 | 10/1974 | Yamada et al................... | 252/62.54 |

*Primary Examiner*—Bernard D. Pianalto
*Attorney, Agent, or Firm*—Johnston, Keil, Thompson & Shurtleff

[57] ABSTRACT

A process for the manufacture of improved magnetic discs by applying a thin layer of a fluid dispersion of magnetic pigments and optional non-magnetic pigments in a binder mixture to a non-magnetic rigid base and curing the magnetic layer which has been applied. The binder consists essentially of from 60 to 90 percent by weight of a solid curable polycondensate of 2,2-bis-(4-hydroxyphenyl)-propane and epichlorohydrin having an epoxide equivalent weight of approximately 400 to 5,000, from 5 to 25 percent by weight of a curable allyloxybenzene-formaldehyde condensate of the resol type with free or alcohol-etherified methylol groups and a molecular weight of less thah 1,000, and from 5 to 30 percent by weight of a curable melamine-formaldehyde condensate with more than two alcohol-etherified methylol groups and a molecular weight of less than 3,000, from 10 to 35 percent by weight of the above epoxy resin being replaced by a reaction product of an epoxy group-containing polycondensate of 2,2-bis-(4-hydroxyphenyl)-propane and epichlorohydrin with the N-methylolamide of a copolymerizable olefinically unsaturated carboxylic acid of 3 to 5 carbon atoms. The magnetic layers thus produced adhere firmly to the base, can be readily ground and polished and are particularly resistant to wear when the magnetic discs are in use.

7 Claims, No Drawings

MAGNETIC DISCS HAVING A MULTI-COMPONENT BINDER

This application discloses and claims subject matter described in German Patent Application P 23 55 840.9, filed Nov. 8, 1973, which is incorporated herein by reference.

The present invention relates to a process for the manufacture of improved magnetic discs by applying a thin layer of a fluid dispersion of magnetic pigments and optional non-magnetic pigments in a binder mixture to a non-magnetic rigid base and curing the magnetic layer which has been applied.

A large number of binders and binder mixtures has already been proposed for the production of magnetic layers for magnetic discs. U.S. Pat. No. 2,914,480, for example, discloses the use of a mixture of a butylated melamine-formaldehyde resin with polyvinylbutyral as a binder for magnetic layers. According to German Patent 1,174,443, solutions of a mixture of an epoxy resin with a phenolic resin intermediate and polyvinyl methyl ether are used to produce magnetic layers on aluminum discs. Whilst the former binder mixtures give magnetic layers of inadequate mechanical strength, the latter mixtures are difficult to apply by conventional methods and give magnetic coatings with an uneven surface which results in bouncing of the flying head, especially if the coatings are, for example, less than about 2 $\mu$ in thickness.

It is an object of the present invention to provide, within the scope of the customary methods of producing magnetic layers for magnetic discs, for example by the application of a fluid magnetic pigment dispersion by the spin-coating process, a binder which does not suffer from the disadvantages of the conventional binders used for the purpose, or at least suffers from them to a lesser degree, and which can thus be readily processed and gives firmly adhering magnetic layers which can be readily ground and polished and have a surface which is particularly resistant to wear when the magnetic discs are in use.

We have now found that the production of magnetic discs by applying a thin layer of a fluid dispersion of finely divided magnetic pigment in a binder, containing added volatile organic solvents and, optionally, conventional additives, to the non-magnetic base disc and drying the magnetic layer applied and subsequently grinding and polishing its surface, can be advantageously carried out by using, as the binder, one which consists essentially of a curable mixture of A. from 60 to 90 percent by weight of a solid curable polycondensate of 2,2-bis-(4-hydroxyphenyl)-propane and epichlorohydrin with an epoxide equivalent weight of approximately 400 to 5,000, B. from 5 to 25 percent by weight of a curable allyloxybenzeneformaldehyde condensate of the resol type with free or alcohol-etherified methylol groups and having a molecular weight of less than 1,000 and C. from 5 to 30 percent by weight of a curable melamine-formaldehyde condensate with more than two alcohol-etherified methylol groups and a molecular weight of less than 3,000, in which from 10 to 35 percent by weight of the component A are replaced by D. a reaction product (D) of d1. a polycondensate, containing epoxy groups, of 2,2-bis-(4-hydroxyphenyl)-propane and epichlorohydrin, with d2. the N-methylolamide of a copolymerizable olefinically unsazurated carboxylic acid of 3 to 5 carbon atoms, or by a substantially compatible copolymer of D.

We have also found that it is of advantage to use, as the magnetic pigment, an acicular gamma-iron(III) oxide which has been treated, before dispersion in the binder, with an isocyanate of the formula (II):

wherein R is alkyl of 1 to 18 carbon atoms.

Suitable curable solid polycondensates A of 2,2-bis-(4-hydroxyphenyl)-propane and epichlorohydrin, with an epoxide equivalent weight (number of grams containing 1 gram equivalent of epoxide) of from about 400 to 5,000, especially from about 1,500 to 2,500, are the appropriate commercially available polycondensates and of these, in particular, solid polycondensates having a molecular weight of less than 8,000, especially from about 800 to 3,000. For example, the products sold by Shell Chemical Company under the tradenames "Epon 1001", "Epon 100)" and "Epikote 1009" are very suitable.

The product sold under the tradename "Methylon 75108" by General Electric Co. may be mentioned as an example of a particularly suitable curable allyloxy-benzene-formaldehyde condensate B.

Particularly suitable curable melamine-formaldehyde condensates C are precondensates obtained by the reaction of 1 mole of melamine with more than 2 moles, especially from 4 to 6 moles, of formaldehyde in an alkaline medium, the reactive methylol groups of such precondensates being partially or, preferably, substantially etherified with an alcohol and preferably with butanol (isobutanol or especially n-butanol). A suitable commercial product of this type is the surface-coating resin "Luwipal 030" manufactured by BASF Aktiengesellschaft, 6700 Ludwigshafen, Germany.

The process according to the invention uses a binder mixture wherein from 10 to 35 percent by weight of the component A in the mixture of components A + B + C are replaced by an additional component D, which is a reaction product of (d1) a polycondensate, containing epoxy groups, of 2,2-bis-(4-hydroxyphenyl)-propane and epichlorohydrin, with (d2) the N-methylolamide of a copolymerizable olefinically unsaturated carboxylic acid of 3 to 5 carbon atoms. The compounds mentioned above as component A can be used as the epoxy group-containing polycondensates (d1), but lower molecular weight epoxy resins based on bisphenol A and epichlorohydrin and having an epoxide value of from about 0.5 to 1, have also proved very suitable, an example being the product sold under the tradename "Epikote 828" by Shell. Of the N-methylolamides of a copolymerizable olefinically unsaturated carboxylic acid of 3 to 5 carbon atoms, such as acrylic acid, methacrylic acid, maleic acid or fumaric acid, which may be used, the N-methylolamides of acrylic acid and methacrylic acid are preferred. The reaction or etherification of the epoxy resin (d1) with the N-methylolamide (d2) is preferably carried out at temperatures of from about 50° to 120°C, where appropriate in the presence of catalysts, such as organic or inorganic acids, for example phosphoric acid, benzoic acid or fatty acids, and the starting components are advantageously used in a ratio such that there are from 0.2 to 5, preferably from 0.9 to 4, free hydroxyl groups of the epoxy resin available per methylolamide group. The resulting reaction products D in general have the formula (I):

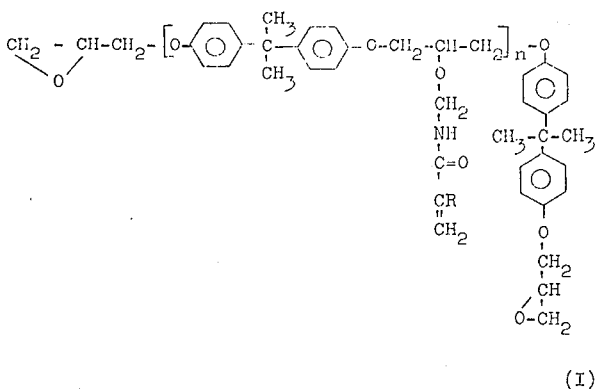

(I)

wherein R is hydrogen or methyl and $n$ is an integer from 2 to 30 and preferably from 3 to 10.

According to the invention it is also possible to use, instead of the polymerizable reaction product D, a substantially compatible copolymer of this reaction product, such as can be obtained by free-radical copolymerization of the compounds D with other olefinically unsaturated monomers. The copolymers may contain from 10 to 95 percent by weight, preferably from about 10 to 50 percent by weight, based on the total amount of monomer, of units of reaction product D. Preferred comonomers are the alkyl esters of acrylic acid or methacrylic acid of from 1 to 20 carbon atoms in the alkyl radical. Other suitable copolymers are those with acrylic acid esters or methacrylic acid esters which in addition contain up to 40 percent by weight, and preferably from 10 to 30 percent by weight, of units of a vinylaromatic compound, such as styrene or vinyltoluene. Copolymers which contain units of hydroxyalkyl acrylates or methacrylates, preferably in amounts of from about 5 to 30 percent by weight, or N-methylolamides of olefinically unsaturated carboxylic acids of 3 to 5 carbon atoms or their ethers with aliphatic alcohols in amounts from 5 to 30 percent by weight, have also proved of value; the preceding percentages are all based on the total amount of monomer. A particularly suitable copolymer of the reaction product D is, for example, a copolymer derived from 10 to 35 percent by weight of the reaction product D, 10 to 30 percent by weight of an ester of acrylic acid or methacrylic acid of from 4 to 8 carbon atoms in the alkyl radical, 10 to 30 percent by weight of a hydroxyalkyl acrylate or methacrylate, 10 to 30 percent by weight of an ether of a monoalcohol of 1 to 8 carbon atoms and N-methylolacrylamide or N-methylolmethacrylamide and 15 to 35 percent by weight of styrene or vinyltoluene.

Whereas in the case of the monomeric reaction product D the preferred proportion of D is approximately from one-tenth to one-fifth of the sum of the amouns A + D, in the case of copolymers this proportion is preferably from one-fifth to one-third of the sum of the amounts of the components A + D.

Suitable magnetic pigments for the magnetic coating are the conventional materials such as magnetite ($Fe_3O_4$) and, preferably, acicular gamma-iron(III) oxide ($\gamma$-$Fe_2O_3$) with an average particle size of from about 0.1 to 2 $\mu$. The amount by weight of the magnetic pigments is in general from 0.5 to 3 times, preferably from about 0.8 to 1.5 times, the weight of the binder mixture used. It has been found to be particularly advantageous to treat the dry magnetic pigment, and especially the dry gamma-iron(III) oxide, with a special monoisocyanate of the above formula (II) before preparing the magnetic coating mixture (which can be prepared by a conventional method). This pretreatment is carried out, for example, by making a paste from the magnetic pigment, a solvent which is free from groups which react with an isocyanate group, such as ethylglycol acetate, cyclohexane or other high-boiling organic solvents of a similar type, and the trialkylsilyloxysulfonyl-isocyanate, for example trimethylsilyloxysulfonyl-isocyanate, and sometimes, with advantage, also subjecting the pasty mixture to a gentle dispersing action. In this treatment, advantageously from about 0.5 to 5 parts by weight, and preferably from 0.8 to 2 parts by weight, of the said monoisocyanate are used per 100 parts by weight of the magnetic pigment. The preferred period of contact in the pretreatment with the above isocyanate is approximately from 1 to 16 hours. The binders according to the invention are then added. Of course, the magnetic layer may also contain conventional additives, for example dispersing aids or lubricants, in the conventional small amounts. It is advantageous to add to the magnetic layer, by conventional methods, hard non-magnetic powders having a Mohs' hardness greater than 6 and a particle size approximately corresponding to from 0.5 to 1.5 times the final thickness of the magnetic layer, such as corundum powder, non-magnetic iron oxide or boron carbide powder.

Solvents or solvent mixtures which can be used to prepare the pigment-binder dispersions are the conventional volatile solvents for surface-coating binders, such as aromatic hydrocarbons, for example xylene, alcohols and glycols, for example propanol or butanol, or their esters or ethers, for example ethylglycol acetate, ketones, for example acetone or methyl ethyl ketone ethers, for example tetrahydrofuran or dioxane, or strongly polar solvents, for example dimethylformamide, and, of course, mixtures of such solvents. A particularly suitable solvent for the preparation of the dispersion is a mixture of ethylglycol acetate, dimethylformamide and xylene or cyclohexane in place of xylene. The most advantageous weight ratio of these solvent components is approximately 1:1:1. In general, approximately from 100 to 150 parts by weight of solvents are used per 100 parts by weight of combined binder and magnetic pigment.

Conventional non-magnetic metallic base discs, especially of aluminum or aluminum alloy, in the customary sizes and thicknesses, can be used for the process according to the invention. For the manufacture of magnetic discs with thin magnetic layers, in particular, it is advantageous to use base discs with polished surfaces. In some cases it is advantageous to use a disc of aluminum or aluminum alloy, one or both sides of which have been polished and have a peak-to-valley height $R_t$ of from about 0.01 to 0.5 $\mu$, and have been coated with a thin (generally from 1 to 10 $\mu$ thick) hard intermediate layer of coating resin which preferably contains non-magnetic pigments. It is advantageous to use binders which are the same as or similar to those used for the magnetic layer for this intermediate layer, and to bake the intermediate layer before polishing.

The magnetic dispersion can be prepared by a conventional dispersing process. The application of the magnetic dispersion to the base disc can also be carried out by conventional methods. A coating technique which can be employed is described, for example, in U.S. Pat. No. 2,913,246. It is advantageous first to apply a layer of the magnetic dispersion to the slowly rotating base disc, for example by spraying, and then to obtain the desired magnetic coating thickness by rotating the disc at high speed. In the preferred embodiment, the base discs are simultaneously provided with a magnetic layer on both sides, the base discs in general being rotated in an inclined position, i.e. at an angle of from about 45° to 80° to the horizontal, during application of the dispersion. After the coating process is over, the magnetic layer is heated to cure it; in this treatment the coated base disc is advantageously heated to a temperature of from about 180° to 250°C, usually for ¼ to 1 hour. Following this baking step, the surface of the baked magnetic layer is ground and polished to give the desired low degree of surface roughness. The magnetic coating is advantageously ground with a fine diamond powder in the form of a paste, i.e. with addition of a lapping oil, the preferred maximum particle size of the diamond powder being from 5 to 8 $\mu$. Discs of a polyvinyl alcohol sponge, advantageously with an average pore diameter of from 0.5 to 5 mm, have proved to be a suitable carrier material for use in the grinding operation; during grinding, these discs rotate and are pressed against the magnetic coating under a pressure of 0.02 to 2.0 kg/cm². The speed of rotation of the discs is in general from about 40 to 200, preferably from 80 to 150, r.p.m. After grinding for approximately 1 to 5 minutes, the magnetic coating is advantageously polished, for example for approximately 0.5 to 3 minutes with rotating felt discs and preferably co-using a very fine diamond powder with a particle size less than 2 $\mu$ and preferably less than 1 $\mu$. Particularly in the production of very thin magnetic layers, especially layers with a final thickness of from about 0.5 to 5 $\mu$, it has proved advantageous to re-heat the resulting discs, advantageously for at least ½ hour and preferably from ¾ to 1 ½ hours, at a temperature of from 180° to 250°C.

The process according to the invention is distinguished by the fact that the binder mixtures are eminently suitable for use in magnetic dispersions to be applied by the spin-coating process because they give perfect flow under the action of centrifugal force. The binders used according to the invention also bring about excellent dispersion and distribution of the magnetic pigment in the coating, resulting in optimum magnetic values. The adhesion of the magnetic layers to aluminum discs is outstanding and, after baking, the layers can be ground and polished so well that peak-to-valley heights of less than 0.1 $\mu$ can be obtained. Especially the surface hardness of the magnetic layers, which is not accompanied by brittleness, is worthy of particular mention. This results in particularly good resistance of the magnetic layers produced according to the invention to head landings on discs rotating at extremely high speed.

The invention is further illustrated by the following Examples in which parts and percentages are by weight, unless stated otherwise. Parts by volume bear the same relation to parts by weight as the liter to the kilogram.

EXAMPLE 1

A coating mixture consisting of 19.6% of acicular gamma-iron(III) oxide having a tap density of 0.8 g/cm³; 0.6% of polydimethylsiloxane; 1.9% of a reaction product of 100 parts of Epikote 1001 (hydroxyl value 0.32; product of Shell Chemical Co.) and 34 parts of N-methylolmethacrylamide as component C; 12% of Epikote 1009 (product of Shell Chemical Co.) as component A; 3% of a commercial curable allyloxybenzene-formaldehyde condensate having a molecular weight of approximately 320 as component B; 3% of a melamine-formaldehyde precondensate etherified with n-butanol as component C; 0.9% of corundum powder with a particle size of from 2 to 6 $\mu$; and 59% of a solvent mixture of equal parts of ethylene glycol acetate, dimethylformamide and xylene is introduced into a tube mill filled with steatite balls and dispersed for 60 hours. The dispersion is then forced through filter paper and applied by the spin-coating method to 1.2 mm thick aluminum discs having a diameter of 355 mm which have been cleaned beforehand in a solvent vapor bath. After coating at approximately 400 r.p.m., the wet film thickness is adjusted by increasing the speed of rotation of the disc to approximately 2,000 r.p.m., so that, after drying and baking at 200°C for 1 hour, a 3.7 to 4.2 $\mu$ thick magnetic coating is obtained. The magnetic discs are then ground and polished on both sides with rotating polyvinyl alcohol foam discs using diamond powder and a higher liquid hydrocarbon as grinding fluid.

The finished magnetic discs are subjected to the tests described in Example 3. The results of the tests are given in Table 1.

EXAMPLE 2

The following composition is chosen for the magnetic dispersion: 19.6% of acicular gamma-iron(III) oxide having a particle size of from 0.1 to 4 $\mu$; 0.6% of polydimethylsiloxane; 11% of Epikote 1009 (product of Shell Chemical Co.) as component A; 2% of the curable allyloxybenzene-formaldehyde condensate used in Example 1 as component B; 4% of the etherified melamine-formaldehyde condensate used in Example 1 as component C; 0.9% of corundum powder with a particle size of from 2 to 6 $\mu$; 59% of a mixture of equal parts of ethylene glycol acetate, dimethylformamide and xylene; and 2.9% of a copolymer of 16 parts of the reaction product of Epikote 1001 with N-methylolmethacrylamide according to Example 1, 25 parts of monostyrene, 17 parts of 2-ethylhexyl acrylate, 17 parts of N-n-butoxymethylmethacrylamide and 17 parts of hydroxypropyl acrylate, as component D.

The procedure followed is otherwise exactly the same as in Example 1. The finished magnetic discs are also subjected to the tests indicated in Example 3. Table 1 gives the results.

EXAMPLE 3

The procedure of Example 1 is followed except that, prior to the addition of the other components, the gamma-iron(III) oxide is pretreated with the solvent mixture and 1.5 percent by weight, based on the oxide, of trimethylsilyloxysulfonylisocyanate in a tube mill for 1 hour. The other components are then added and thereafter the procedure of Example 1 is followed. The resulting magnetic discs are subjected to the tests described below; the results of the tests are given in Table 1.

a. Resistance to head landings

The flying head of a commercial memory drive unit is so controlled that it lands 1,000 times at the same place on the magnetic disc; the head should, after each landing, assume a flying position relative to the surface of the disc. The appearance of the surface of the magnetic disc after the test is assessed.

b. Dropouts

The disc is mounted on a commercial memory drive unit and the number of dropouts on an inner track is counted, the threshold being kept constant for the entire series of experiments.

c. Flying behavior

The head is brought into flying position relative to the surface of the disc and the flight is assessed.

d. Signal level

The read voltage of an inner track achieved at a specific constant write current is determined in mv.

TABLE 1

| Results of the tests: | Example 1 | Example 2 | Example 3 |
|---|---|---|---|
| Thickness of finished magnetic coating (inner edge/outer edge of disc) ($\mu$) | 3.7–4.1 | 3.9–4.2 | 3.9–4.1 |
| Peak-to-valley height $R_t$ ($\mu$) | 0.022 | 0.020 | 0.019 |
| Resistance to head landings | good | good | very good |
| Number of dropouts | 0 – 1 | 0 – 3 | 0 |
| Flight | steady | steady | steady |
| Signal level (mv) | 3.6 | 3.4 | 3.8 |

D. a free-radical polymerization product of

D 1. at least 10 percent by weight of a reaction product of (d1) a polycondensate, containing epoxy groups, of 2,2-bis-(4-hydroxyphenyl)-propane and epichlorohydrin with (d2) the N-methylolamide of a copolymerizable olefinically unsaturated carboxylic acid of 3 to 5 carbon atoms; and D 2. 0 to 90 percent by weight of at least one olefinically unsaturated monomer selected from the group consisting of alkyl esters of acrylic or methacrylic acid with from 1 to 20 carbon atoms in the alkyl radical, vinylaromatic compounds, hydroxyalkyl acrylates or methacrylates, N-methylolamides of olefinically unsaturated carboxylic acids of 3 to 5 carbon atoms and the ethers of said N-methylolamides with aliphatic alcohols.

We claim:

1. A process for the manufacture of magnetic discs by applying a thin layer of a fluid dispersion of finely divided magnetic pigment in a binder, containing added volatile organic solvents and, optionally, conventional additives, to the non-magnetic base disc and drying the magnetic layer applied and subsequently grinding and polishing its surface, wherein the binder used consists essentially of a curable mixture of A. from 60 to 90 percent by weight of a solid curable polycondensate of 2,2-bis-(4-hydroxyphenyl)-propane and epichlorohydrin with an epoxide equivalent weight of approximately 400 to 5,000, B. from 5 to 25 percent by weight of a curable allyloxybenzene-formaldehyde condensate of the resol type with free or alcohol-etherified methylol groups and having a molecular weight of less than 1,000 and C. from 5 to 30 percent by weight of a curable melamine-formaldehyde condensate with more than two alcohol-etherified methylol groups and a molecular weight of less than 3,000, in which from 10 to 35 percent by weight of the component A are replaced by 2. A process as claimed in claim 1, wherein the reaction product D is a compound of the formula (I):

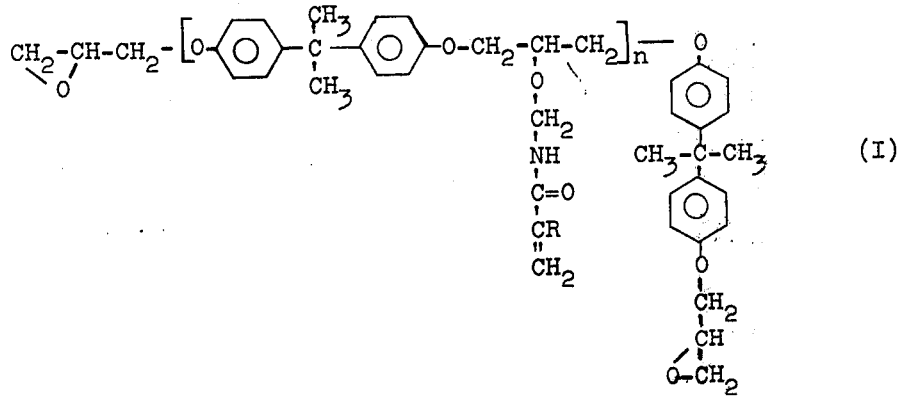

wherein R is H or CH$_3$ and $n$ is an integer from 2 to 30.

3. A magnetic disc prepared by the process of claim 2.

4. A magnetic disc prepared by the process of claim 6.

5. A process as claimed in claim 1, wherein the magnetic layer which has been applied is cured at a temperature of from 180° to 250°C before being ground.

6. A process as claimed in claim 1, wherein the magnetic pigment is an acicular gamma-iron(III) oxide which, prior to dispersion, has been treated with an isocyanate of the formula (II):

wherein R is alkyl of 1 to 18 carbon atoms.

7. A magnetic disc prepared by the process of claim 1.

* * * * *

UNITED STATES PATENT AND TRADEMARK OFFICE
CERTIFICATE OF CORRECTION

PATENT NO. : 3,955,037
DATED : May 4, 1976
INVENTOR(S) : MARX et al

It is certified that error appears in the above-identified patent and that said Letters Patent are hereby corrected as shown below:

In the Heading, delete " Foreign Application Priority Data November 8, 1973    Germany    2355849 " and substitute -- Foreign Application Priority Data   November 8, 1973 Germany    23 55 840 --

In Column 3, Line 63, delete " ... the amouns A " and substitute -- ... the amounts A --

In Column 4, Line 27, the sentence beginning with " Of course, ..." through the sentence in Line 36 ending in " ... boron carbide powder. " should be a seperate paragraph.

Signed and Sealed this

Twenty-second Day of March 1977

[SEAL]

Attest:

RUTH C. MASON
*Attesting Officer*

C. MARSHALL DANN
*Commissioner of Patents and Trademarks*